United States Patent [19]

Adams et al.

[11] 3,724,786
[45] Apr. 3, 1973

[54] AIRCRAFT GROUND SPEED CONTROL SYSTEM
[75] Inventors: Don L. Adams, Fairfield; Louis S. Cotton, Monroe, both of Conn.
[73] Assignee: United Aircraft Corporation, East Hartford, Conn.
[22] Filed: May 20, 1971
[21] Appl. No.: 146,575

[52] U.S. Cl..............244/77 G, 244/17.13, 244/77 D
[51] Int. Cl...............................................B64c 13/50
[58] Field of Search.....235/150.2, 150.22; 244/77 R, 244/77 A, 77 D, 77 G, 17.13; 303/21; 317/5; 318/489; 324/160–162; 340/262–263

[56] References Cited

UNITED STATES PATENTS 3,624,364  11/1971  Dommasch......................244/77 D X
3,547,501  12/1970  Harned et al......................303/21 BE
3,448,948  6/1969   Reerink..............................244/77 G
3,071,335  1/1963   Carter, Jr............................244/77 R Primary Examiner—Milton Buchler
Assistant Examiner—Stephen G. Kunin
Attorney—Melvin P. Williams

[57] ABSTRACT

An integration of the difference between a desired aircraft acceleration and the actual aircraft acceleration provides a signal which is compared with an aircraft speed dependent parameter for generating a signal used to cause the aircraft to alter its acceleration to the desired value. The actual acceleration of the aircraft is determined by differentiating a signal proportional to the aircraft ground speed, which is provided by a doppler radar apparatus.

2 Claims, 1 Drawing Figure

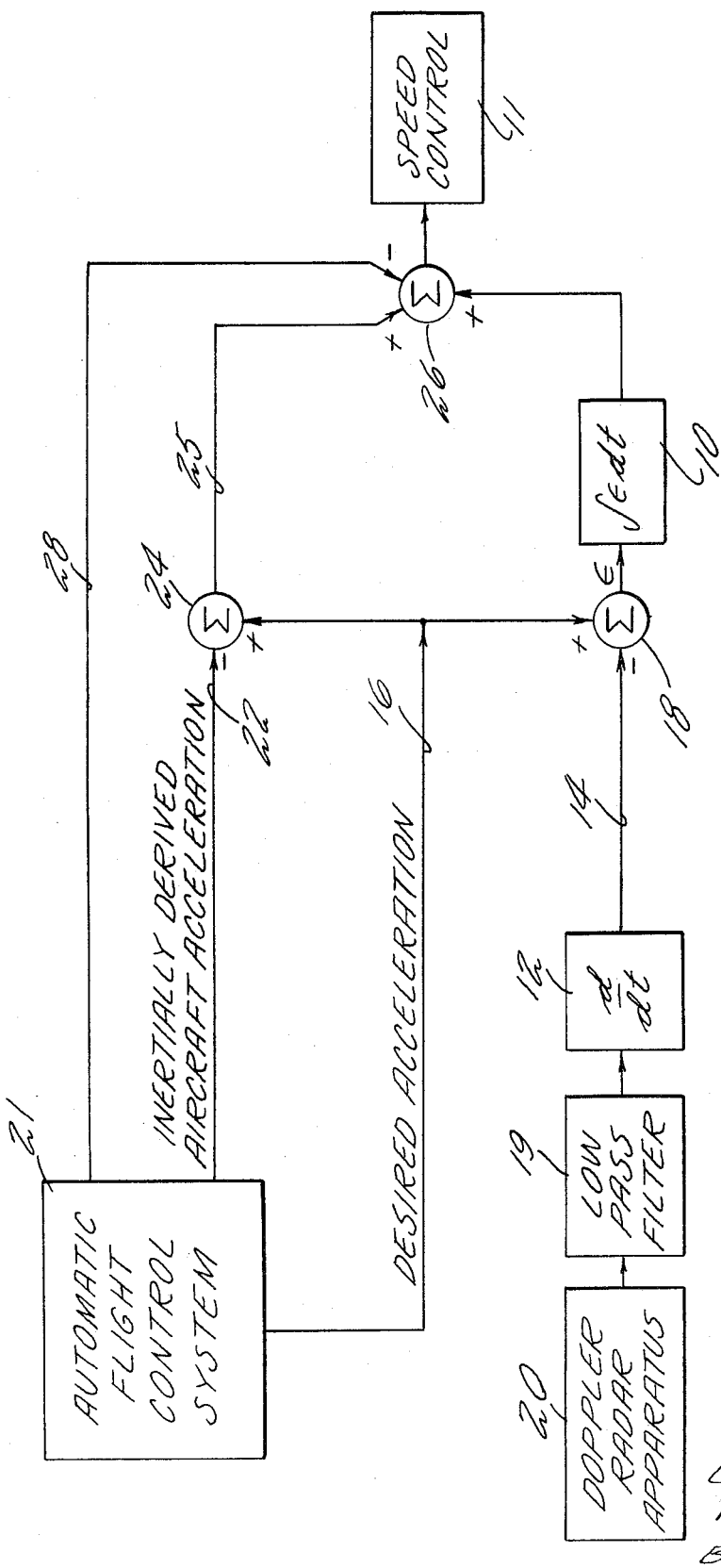

AIRCRAFT GROUND SPEED CONTROL SYSTEM

The invention herein described was made under Contract No. N00019-68-CA-0013 with the Department of the Navy.

BACKGROUND OF THE INVENTION

1. Field of Invention

This invention relates to flight control systems for aircraft, and particularly to a system for controlling the ground speed of an aircraft.

2. Description of the Prior Art

In aircraft flight control systems known to the prior art, ground speed is seldom a controlled parameter; measurement and control of air-speed has been more common. The recent emphasis on shorter runways at airports has given rise to a need for a flight control system wherein the velocity or ground speed of an aircraft is controlled during a flight profile while the aircraft is ascending or descending.

The desirability of an aircraft control system having ground speed as a controlled variable has been long felt by the manufacturers of flight control systems for helicopters since these aircraft are required to take off and land in areas severely restricted in size. Unlike conventional aircraft, the degree of control required in a helicopter is from zero ground speed (hover) to several hundred knots.

A prior art system for controlling ground speed compares a desired acceleration to an acceleration measured by an accelerometer aboard a helicopter and integrates the results of the comparison; the output of the integrator is used to directly control the trim angle of the rotor of the helicopter to change its pitch attitude, thereby controlling its speed. In control systems of this type, when the helicopter reaches a desired ground speed, the desired acceleration input to the control system is brought to zero, thereby maintaining a constant ground speed.

Since the accelerometer aboard the aircraft also measures a component of the acceleration of gravity dependent upon the aircraft pitch angle, a gyro is used to generate a function proportional to the pitch angle to be subtracted from the accelerometer output. This prior art system described hereinbefore is susceptible to gyro drift errors thereby rendering its performance, under some conditions, only marginally acceptable.

SUMMARY OF THE INVENTION

The object of the present invention is the accurate control of the ground speed of an aircraft.

According to the present invention, the integral of the difference between a desired aircraft acceleration and an actual aircraft acceleration derived from a differentiation of a velocity signal representation provided by any suitable means, provides a signal for varying a control parameter of said aircraft in a manner tending to cause the actual acceleration of said aircraft to be equal to the desired acceleration.

A further accord with the present invention, an inertially derived signal proportional to the acceleration of the aircraft may be used to generate an acceleration error signal proportional to the difference between the desired aircraft acceleration and the actual aircraft acceleration, said acceleration error signal being used to vary said control parameter in a manner enhancing the response time of the aircraft to a desired acceleration.

The present invention is readily adapted for automatic control of the ground speed of an aircraft during its approach or departure from a landing area.

Other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein is a block diagram of a ground speed control system.

DESCRIPTION OF THE PREFERRED EMBODIMENT

Referring now to the drawing, a preferred embodiment of a ground speed control system is illustrated wherein an integrator 10 provides a signal proportional to the integral of the difference between the desired acceleration and the actual acceleration of an aircraft. The output of the integrator 10 is used as the input to a means 11 for controlling the speed of the aircraft in a manner which tends to cause the difference in the accelerations to be a null. The aircraft thereby maintains a constant ground speed in response to a desired acceleration of zero and alters its ground speed in response to a nonzero desired acceleration.

In its simplest form, one embodiment of the invention provides a signal proportional to the acceleration of the aircraft (hereinafter called the acceleration signal), free of any DC offset, by means of a circuit which generates a signal proportional to the first derivative with respect to time of a signal proportional to the aircraft's ground speed. Since the derivative of a constant is zero, a DC offset of the signal proportional to the ground speed is ignored since it produces zero upon being differentiated. But it should be noted that a DC offset of the acceleration signal is indistinguishable by the integrator 10, from a signal proportional to the desired acceleration of the aircraft (hereinafter called the desired acceleration signal). Consequently, a DC offset of the acceleration signal, as in the prior art, would cause an unwanted acceleration of the aircraft at a time that the desired acceleration signal is zero, in contrast with the present invention.

The acceleration signal is generated at the output of a differentiating circuit 12 on a signal line 14. A desired acceleration signal, which may be generated in response to a push button on the pilot's automatic flight system control panel, is provided on a signal line 16 to a summing unit 18. The signal proportional to the difference of the accelerations is provided by the summing unit 18 to the integrator 10. Such a push button is used to connect a voltage indicative of a preset, desired acceleration or deceleration to the line 16. For instance, in one landing flight mode, deceleration at the rate of 0.8 knots per second is standard, and the line 16 would have a voltage applied thereto in correspondence to that rate. The aircraft actual acceleration signal, which is drift free, is developed from a signal proportional to the ground speed generated by a doppler radar apparatus 20 and provided as an input to the differentiator 12. It should be noted that noise which is generated by the doppler radar apparatus 20 which accompanies the aircraft acceleration signal, is averaged and thereby filtered out by the integrator 10. A low-pass filter 19, connected in series with the differentiation circuit 12 and the doppler radar apparatus 20 is used to filter the signal from the doppler radar apparatus 20. Since the response of an aircraft requires time on the order of several seconds, the bandwidth of the control system is correspondingly restricted to reduce noise levels and prevent noise saturation of components of the system.

The output of the integrator 10 is a velocity command which is applied to control apparatus (not shown) which in turn causes a change of the aircraft's ground speed so as to reduce the difference of the desired and actual accelerations to a null because the integrator 10 continually increases its output in response to any input, however small, eventually causing the speed controller to respond by causing the aircraft's actual acceleration to equal the desired acceleration. When the accelerations are nulled, there is no output from the summing unit 18, and the integrator's input goes to zero; the integrator's output then remains (ideally) constant at the desired velocity. For slowly varying or constant signals, the integrator 10 has an infinite gain, since in response to such signals the output of the integrator 10 continually increases with time.

In accordance with another aspect of the present invention, the performance of the ground speed control system is enhanced by an inertially derived acceleration signal, generated by an accelerometer in an automatic flight control system 21. The inertially derived acceleration signal, although subject to drift and not useful at the summing network 18, is relatively noise free compared to the aircraft acceleration signal on the line 14. A second acceleration error signal, proportional to the difference of the desired acceleration and the aircraft's acceleration, (provided by the inertially derived acceleration signal) is sufficiently noise-free for use as one of the signals applied to the means for controlling the speed of the aircraft. Although the inertially derived acceleration signal may have a substantial DC offset, it does not effect the performance of the ground speed control system, as explained hereinafter.

The inertially derived acceleration signal is provided by the automatic flight control system 21 on a signal line 22. A summing unit 24 provides the second acceleration error signal on a line 25 in response to the signals on the lines 16, 22 connected thereto. The output of the summing unit 24 and the output of the integrator 10 are applied to a summing unit 26 which provides, to the means 11 for controlling the speed of the aircraft, a signal proportional to the sum of the aircraft's acceleration error and its integral.

As an example of how the acceleration error signal enhances the performance of the control system, assume that the desired acceleration signal on the line 16 is changed at a time when the desired acceleration is equal to the aircraft's acceleration. The integrator 10 could not cause a rapid response from the means for controlling the aircraft speed. This is because time is the represented variable of integration of the integrator 10, and it therefore requires time to respond. On the other hand, the acceleration error signal, which immediately changes from zero to the value initially equal to the change of the desired acceleration signal, is immediately applied to the means for controlling the aircraft's speed. As the aircraft responds, and its acceleration changes, the acceleration error signal is reduced and finally goes to zero at the time that the desired acceleration is equal to the aircraft's acceleration. This is typical of an error rate signal in a control loop; it enhances the response time of the system.

A DC offset of the inertially derived acceleration signal manifests itself as a DC offset applied by the summing unit 24 to the summing unit 26. Since, at the input of the integrator 10, a null must be present (desired acceleration equal to the aircraft's acceleration) for the integrator 10 to cease changing its output, the integrator 10 automatically compensates for any unwanted slowly varying or DC disturbance at the summing unit 26. This is typical of a feedback control system in that the effects of unwanted disturbances are reduced by a factor equal to the gain from the input of the system to the point of the disturbance. In the present invention the gain, as hereinbefore explained is infinite since it is provided by the integrator 10, and the effect of the DC offset is thereby reduced to zero.

The embodiment of the present invention just described is particularly suited (though not limited) to an environment wherein it controls the ground speed of a helicopter. The automatic flight control system 21 may be generally of the type, and similar to the system disclosed in U.S. Pat. No. 3,071,335 filed Oct. 3, 1958 by E. S. Carter, Jr. and assigned to United Aircraft Corporation which provides a signal proportional to the pitch attitude of the helicopter on a signal line 28. The summing unit 26 provides, other than during acceleration changes, an output proportional to the difference of the output of the integrator 10 and the signal on the line 28 to a rotor trim controller. In the control of the speed of a helicopter, every possible value of constant airspeed of the helicopter is associated with a unique value of the trim angle of its rotor and a unique value of its pitch attitude. Therefore, assuming that the helicopter is flying at a constant ground speed, the output of the integrator 10 is equal to the signal on the line 28 and the output of the summing unit 26 to the rotor trim controller is a null. A change in the output of the integrator 10 causes a signal to the rotor trim controller which tends to change the pitch attitude of the helicopter tending to cause the signal provided by the summing unit 26 to be a null. Therefore, a constant desired acceleration signal on the line 16 causes the rotor trim controller and thus the pitch attitude of the helicopter to change in a manner which tends to cause a null at the output of the summing unit 18; conversely a null at the output of the summing unit 18 is indicative of the helicopter accelerating at a desired acceleration. The desired acceleration on line 16 may be provided by a pilots command as described hereinbefore.

It should be noted that the automatic flight control system 21 may also provide a signal proportional to the rate of change of the aircraft's pitch attitude to the summing unit 26. This signal has an effect similar to that of the acceleration error signal on line 25 described hereinbefore.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. An aircraft ground speed control system of the type which is used with an automatic flight control system of a helicopter, said flight control system providing a signal representative of a desired acceleration, a signal representative of the ground speed of said helicopter and a signal representative of the pitch attitude of said helicopter comprising: differentiating means connected to said flight control system and responsive to said ground speed signal for providing a signal representative of the actual acceleration of the helicopter; first subtraction means connected to said differentiating means and said flight control system and responsive to said desired acceleration signal and said actual acceleration signal, for providing a signal representative of the difference of the accelerations; integrating means connected to said subtraction means for providing a signed representative of the integral of said difference, said integral signal comprising a velocity command signal; and means connected to said integrating means and responsive to said integral signal for changing the speed of the helicopter in a manner proportional thereto, said means for changing the speed includes means connected to said flight control system responsive to said integral signal and said pitch attitude signal for providing a control signal that changes the angle of trim of the rotor of said helicopter in a manner which reduces said difference of the accelerations to a null.

2. An aircraft ground speed control system according to claim 1 wherein said flight control system additionally provides an inertially derived signal representative of the acceleration of the aircraft and said system further comprises:

means enhancing the response of said aircraft to a signal representative of the desired acceleration including a second subtraction means connected to said means for changing the speed of the aircraft and responsive to said inertially derived signal representative of the acceleration of the aircraft and said signal representative of the desired acceleration for applying a signal representative of the difference of said accelerations to said means for changing the speed of the aircraft.

* * * * *